May 19, 1964
C. G. STELCHEK
3,133,702
HOLLOW NOZZLE APPARATUS FOR BLENDING AND
DISTRIBUTING COATING MATERIALS
Filed Dec. 4, 1961
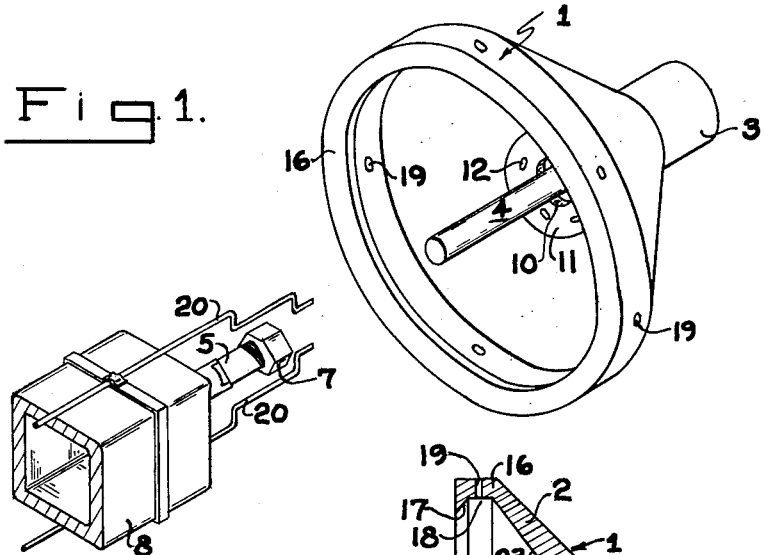
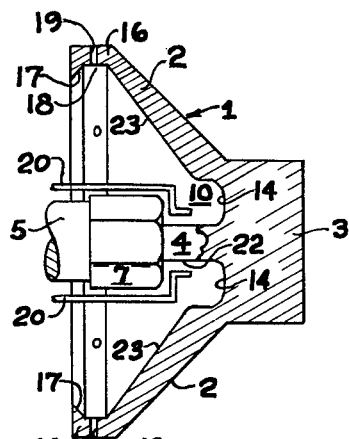
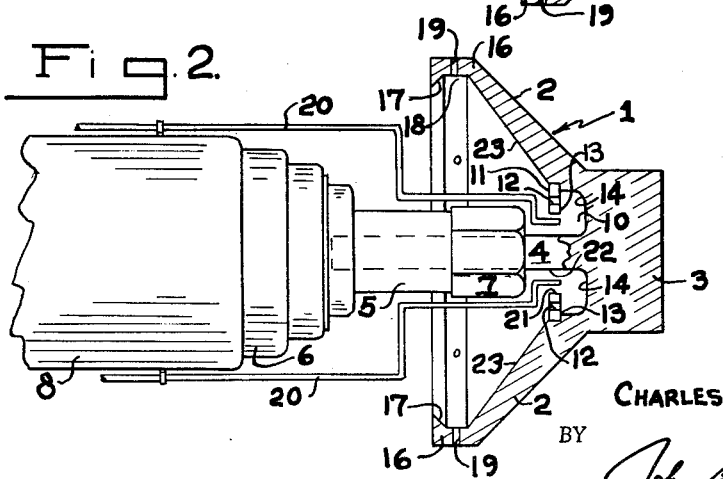
INVENTOR.
CHARLES G. STELCHEK
BY
*John A. McKinney*
ATTORNEY

United States Patent Office 3,133,702
Patented May 19, 1964

3,133,702
HOLLOW NOZZLE APPARATUS FOR BLENDING AND DISTRIBUTING COATING MATERIALS
Charles G. Stelchek, Denison, Tex., assignor to Johns-Manville Corporation, New York, N.Y., a corporation of New York
Filed Dec. 4, 1961, Ser. No. 156,697
3 Claims. (Cl. 239—222)

The present invention relates to apparatus for blending and distributing coating materials and to methods for blending and distributing such coating materials. Also, the present invention relates to apparatus which is self-cleaning. The invention is particularly concerned with coating materials of the type that have a very short pot life in that once the components of the coating material have been blended together the coating material will rapidly set up and solidify. This short pot life is further shortened when the components are blended at elevated temperatures and therefore, when in a hot liquid form, the coating material must be distributed immediately after blending.

In many instances, it is necessary to provide a commercially desired product with certain properties which can only be obtained by providing a product with a coating of a material having the desired properties. For example, it is desirous to provide porous pipe that is subject to chemical attack with interior coatings which will be smooth, hard, fluid-impervious and chemical-resistant. Such coatings are generally provided from resinous or other types of material which have a very short pot life especially when applied in a hot liquid form. Therefore, it is essential that the apparatus used to distribute such coating material be of a nature which allows for the distribution of the coating material immediately after the blending together of the components thereof. Also, because of the shortness of this pot life, it is desirable that means be provided for the efficient cleaning of the apparatus.

An object of the instant invention is to provide means for blending the components of a hot liquid cooling material and distributing such coating material immediately after the blending thereof.

A further object of the instant invention is to provide a method for blending the components of a hot liquid coating material and distributing the coating material immediately after the blending thereof.

In brief, the foregoing objects are accomplished in accordance with the instant invention by a rotatable, hollow nozzle which both blends and distributes a liquid coating material wherein the nozzle has a generally conical inner opening. A blending chamber is provided adjacent what would be the apex of the conical inner opening of the nozzle wherein the blending chamber is formed by a plurality of walls defining a ring shaped cavity having one open end with a perforated ring annulus secured to the wall defining the outer periphery of the cavity adjacent said opening. In operation, the nozzle is rotated and the components of the liquid coating material are fed through separate ducts into the blending chamber. The speed of rotation of the nozzle is such to blend continuously the components of the liquid coating material utilizing the high shear action developed by the rotation of the nozzle. The blended material is moved by the centrifugal forces developed by the continued rotation of the nozzle out of the blending chamber through the perforations in the annulus and over the interior surface of the wall defining the conical inner opening in the nozzle to be distributed through openings in the dispersing portion of the nozzle. The rotation of the nozzle is continued after the flow of the components into the mixing chamber has been stopped so as to allow the nozzle to clean itself virtually free of any residual coating material.

The invention will be more fully understood and further objects and advantages thereof will become apparent when reference is made to the following detailed description of a preferred embodiment of the invention and the accompanying drawing in which:

FIG. 1 is a pictorial representation of elements of the nozzle in detached relationship;

FIG. 2 is a view partly in cross section of a nozzle made in accordance with the instant invention; and FIG. 3 is a view similar to FIG. 2 but illustrating a modified form of nozzle.

Referring to the drawing there is illustrated in FIGS. 1 and 2, a hollow nozzle 1 having a generally conical shaped inner opening defined by sloping side wall 2 for applying a liquid coating material. Adjacent one end, the nozzle 1 is provided with a solid, generally cylindrical base 3 with an integral stem portion 4 extending generally axially of the nozzle 1 and secured in the chuck 5 of an air gun 6 by suitable locking means 7. The air gun 6 is secured to an arm 8 which is movable both parallel and perpendicular to the axis of the nozzle so that the nozzle 1 may be positioned where desired by movement of the arm 8.

A blending chamber 10 is provided adjacent to the base 3 by securing a ring-shaped annulus 11 to the interior surface of the side wall 2 adjacent one end thereof. The blending chamber 10 is generally defined by the walls 13 of the annulus 11 and the interior cup shaped surface of the walls 14 of the base 3. The stem 4 cooperates with the walls 13 and the annulus 11 so that the blending chamber 10 is a substantially ring-shaped cavity.

At the other end of the side walls 2 and integral therewith, the nozzle 1 comprises a generally cylindrical portion 16. An inwardly extending lip 17 provides a well 18 for retarding the movement of the liquid coating material, to be described below, so that the liquid coating material will flow out through the openings 19 in the cylindrical portion 16.

The coating material is supplied to the blending chamber 10 through a plurality of ducts 20. In FIGS. 1 and 2, there are illustrated two ducts 20 but it is to be understood that as many ducts as desirable or required may be utilized to supply the components of the coating material to the blending chamber 10. Each duct 20 is secured to the arm 8 or other non-rotating part of the air gun 6 and is positioned so as to discharge its contents into the blending chamber 10 through the opening between the inner surface 21 of the annulus 11 and the exterior surface 22 of the stem 4.

As stated previously in the application, the nozzle 1 described above is particularly suited for blending and distributing liquid coating materials which have a very short pot life once the components of the coating material have been combined. By this is meant, that the coating material is a liquid when formed but will rapidly set up or solidify especially at elevated temperatures. To accomplish the proper blending of the components of the coating material and rapidly distribute the coating material thus formed, the nozzle 1 is rotated by the air gun 6, or other suitable apparatus, at a speed sufficient to provide high shear forces for the proper blending of the components. Also, the continued rotation of the nozzle after blending distributes the coating material even about the complete periphery of the nozzle.

In operation of the apparatus, described above, the nozzle 1 is secured to the chuck 5 of the air gun 6 which, in the preferred embodiment, is rotated at a speed of approximately 8500 r.p.m. During the rotation of the nozzle 1, the components of the coating material, which components had been previously heated to a desired temperature, are fed through the ducts 20 and are discharged by each duct 20 into the blending chamber 10 against the surface 14. The high shear forces caused by the rotation of the nozzle 1 result in an initial blending of the components to be formed into the liquid coating material. The centrifugal forces generated by the continued rotation of the nozzle cause the liquid coating material to flow out of the blending chamber 10 through the perforations 12 and over the interior surface 23 of the side wall 2. The blending of the components of the liquid coating material is continued during the passage of this material over the interior surface 23 of the side wall 2. The high shear action obtained from the rotation of the nozzle provides a unique means to accomplish the desired blending of the components of the coating material. The blended coating material continues movement over the interior surface 23 until it reaches the well 18 formed by the lip 17 and moves out through the openings 19. In this manner, the components of the liquid coating material are blended and the hot liquid coating material is distributed evenly about the complete periphery of the nozzle.

In an application of coating material in accordance with the method of the instant invention, a nozzle having an outside diameter of 3 inches adjacent the cylindrical portion 16 thereof was used to apply a hot liquid resin coating material comprising an epoxy resin to the interior surface of a 6 inch class 150 asbestos-cement pipe. The liquid epoxy resin coating material, comprising a bisphenol A-epichlorohydrin resin (Epon 828, Shell Chemical Corporation) and finely divided silica combined with a silicone resin (SR-82, General Electric Co.) flow control agent, and a triethylenetetramine curing agent, was blended in the blending chamber 10 wherein the temperature of the components when fed into the blending chamber was approximately 230° F. The resin, the silica and the flow control agent were fed through one of the ducts 20 and the curing agent was fed through the other duct 20. The nozzle was rotated at approximately 8500 r.p.m. and was moved generally axially through the 6 inch asbestos-cement pipe in a generally linear direction at a speed of about 7.3 feet per minute to apply a substantially uniform coating of about 20 mils in thickness to the interior surface of the asbestos-cement pipe. The above example is given for illustration purposes only and is not intended to limit the method and apparatus disclosed in the instant invention in any manner. As stated previously in the specification, the method and apparatus of the instant invention are particularly useful with any type of coating material wherein the coating material comprises a blend of various components and which coating material has a very short pot life once the components have been blended. Also, the size of the nozzle may vary in accordance with the diameter of the article to be coated. Likewise, the speed of rotation may vary according to the characteristics of coating material being applied. However, experience has indicated that the speed of rotation for a nozzle having a 3 inch outside diameter, as described above, should not be appreciably less than 4000 r.p.m. or appreciably greater than 17,000 r.p.m.

Another desirable feature of the apparatus described in the instant invention, is its self-cleaning characteristic. An undesirable characteristic found in prior art devices utilized in applying resinous coating materials, of the type described above, is the necessity to interrupt periodically the application of the coating material to clean the spray nozzle. The apparatus of the instant invention obviates this by being self-cleaning. The flow of the components through the ducts 20 is stopped at a predetermined time during each lining operation so that all of the components delivered to the blending chamber move out of the blending chamber over the interior surface 23 of the side walls 2 to be distributed completely through the openings 19 in the nozzle 1 during each travel of the nozzle 1 through the pipe.

In FIG. 3, there is illustrated a modification of the nozzle in which the ring annulus 11 is omitted from the blending chamber 10. In the modification illustrated in FIG. 3, the components are introduced into the blending chamber 10 against the surface 14 and after being initially blended the coating material is urged by the centrifugal forces generated by the rotation of the nozzle to flow out of the blending chamber and over the interior surface 23 of the side wall 2 until it reaches the well 18 in a manner as described above.

While the invention has been described in rather full detail, it will be understood that these details need not be strictly adhered to and that various changes and modifications may suggest themselves to one skilled in the art, all falling within the scope of the invention as defined by the subjoined claims.

What I claim is:

1. Apparatus for blending and distributing a liquid coating material comprising a plurality of components blended to form a coating material which will rapidly set up and solidify comprising:
    (a) a hollow nozzle having a substantially conical inner opening,
    (b) means defining a blending chamber located adjacent the apex portion of said conical inner opening of said nozzle,
    (c) means for rotating said nozzle,
    (d) means for adding into said blending chamber the components of said liquid coating material during the rotation of said nozzle,
    (e) said components of said liquid coating material consisting essentially of a liquid resin and a liquid curing agent which after being blended together will rapidly set up and solidify,
    (f) said components being blended together in said blending chamber by the centrifugal forces generated by the rotation of said nozzle,
    (g) means defining a distributing portion of said nozzle comprising a continuous sloping side wall forming said conical opening and communicating at one end with said blending chamber and at the other end to an annular distributing portion having a plurality of openings therein through which said liquid coating material is distributed by the centrifugal forces generated by the rotation of said nozzle to be deposited on the surface to be coated,
    (h) said one end having a diameter less than said other end, and
    (i) a radially inwardly extending wall on said distributing portion adjacent said other end theerof to insure the flowing of said liquid coating material through said openings.

2. Apparatus as defined in claim 1 wherein said blending chamber comprises:
    (a) a plurality of walls defining a ring-shaped cavity opened at one end, and
    (b) a ring-shaped annulus secured to the wall defining the outer periphery of said cavity adjacent the opened end thereof to impede the flow of the liquid coating material from said cavity,
    (c) said annulus having a plurality of openings therein to regulate the flow of the liquid coating material out of said cavity.

3. Apparatus for blending and distributing a liquid coating material comprising a plurality of components blended to form a coating material which will rapidly set up and solidify comprising:
    (a) a hollow nozzle having a substantially conical inner opening,
    (b) means defining a blending chamber located adjacent the apex portion of said conical inner opening of said nozzle,
    (c) said blending chamber comprising a plurality of walls defining a ring-shaped cavity open at one end,
(d) means for rotating said nozzle,
(e) means for adding into said blending chamber the components of said liquid coating material during the rotation of said nozzle,
(f) said components of said liquid coating material consisting essentially of a liquid resin and a liquid curing agent which after being blended together will rapidly set up and solidify,
(g) said components being blended together in said blending chamber by the centrifugal forces generated by the rotation of said nozzle,
(h) means defining a distributing portion of said nozzle comprising a continuous sloping side wall forming said conical opening and communicating at one end with said blending chamber and at the other end to an annular distributing portion having a plurality of openings therein through which said liquid coating material is distributed by the centrifugal forces generated by the rotation of said nozzle to be deposited on the surface to be coated, and (i) said one end having a diameter less than said other end.

References Cited in the file of this patent

UNITED STATES PATENTS

| | | | |
|---|---|---|---|
| 1,289,779 | Howard | Dec. 31, | 1918 |
| 1,624,847 | Riley | Apr. 12, | 1927 |
| 1,779,336 | Riley | Oct. 21, | 1930 |
| 1,853,682 | Hechenbleikner | Apr. 12, | 1932 |
| 2,182,897 | Loepsinger | Dec. 12, | 1939 |
| 2,695,246 | Jurgensen et al. | Nov. 23, | 1954 |
| 2,975,756 | Reindl et al. | Mar. 21, | 1961 |
| 3,034,729 | Gray et al. | May 15, | 1962 |

FOREIGN PATENTS

| | | | |
|---|---|---|---|
| 170,850 | Austria | Mar. 25, | 1952 |
| 661,768 | Great Britain | Mar. 15, | 1949 |
| 747,543 | Great Britain | Apr. 4, | 1956 |